Figure 1:
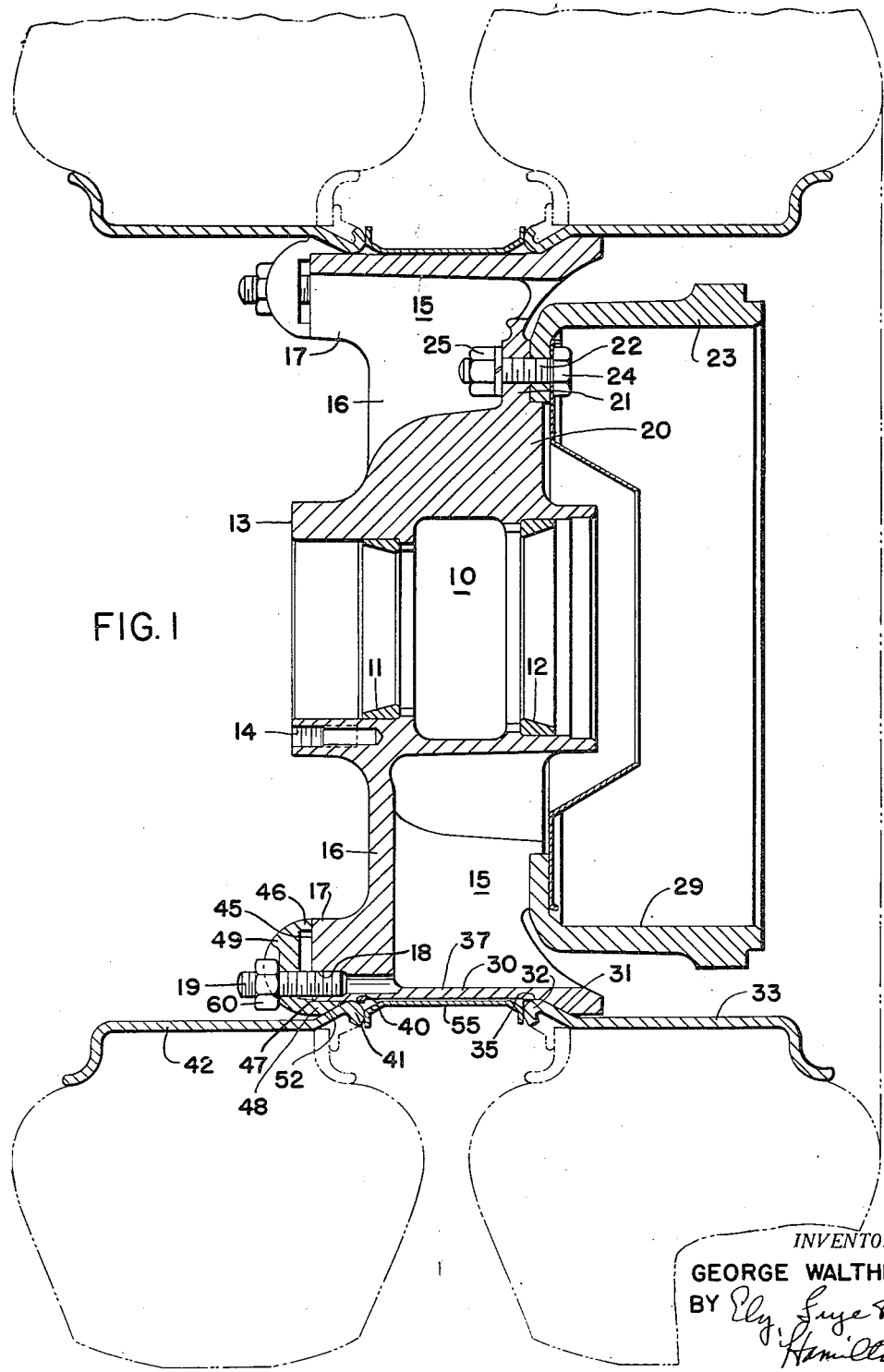

Oct. 16, 1956　　　G. WALTHER, SR　　　2,767,026
VEHICLE WHEEL FOR MOUNTING TIRE RIMS
Filed Oct. 28, 1954　　　　　　　　　　3 Sheets-Sheet 1

INVENTOR.
GEORGE WALTHER, SR
BY
ATTORNEYS

Oct. 16, 1956 G. WALTHER, SR 2,767,026
VEHICLE WHEEL FOR MOUNTING TIRE RIMS
Filed Oct. 28, 1954 3 Sheets-Sheet 3

INVENTOR.
GEORGE WALTHER, SR.
BY
*Ely, Frye & Hamilton*
ATTORNEYS

United States Patent Office 2,767,026
Patented Oct. 16, 1956

2,767,026

VEHICLE WHEEL FOR MOUNTING TIRE RIMS

George Walther, Sr., Dayton, Ohio, assignor to The Dayton Steel Foundry Company, Dayton, Ohio, a corporation of Ohio Application October 28, 1954, Serial No. 465,303

11 Claims. (Cl. 301—13)

The present invention relates to vehicle wheels for mounting tire rims and while the invention relates primarily to an improved wheel construction which will permit mounting of dual demountable tire rims in a secure, concentric and accurately aligned manner, the principles thereof may be applied to the mounting of single rims.

It is highly desirable to provide a mounting for dual rims which will insure that both rims are in positive and exact alignment with the plane of rotation of the wheel. Heretofore, the wheel manufacturers have provided a variety of devices in attempts to secure correct alignment. Among the expedients employed have been screw type spacers, so called "flop-over-central-abutment" spacers, the Vanderveer aligning spacer and other devices. While it is claimed that those devices will secure and maintain exact and accurate alignment, in fact they do not do so.

One difficulty in securing and maintaining accurate alignment has been the problem of keeping the rear or inboard rim in alignment while the spacer, outboard rim and clamps are placed in position. The standard type of rim mounting has been through the beveled surface on the inside of the gutter which rests upon a corresponding bevel surface on the wheel or spoke ends. The weight of the rim and tire will cause the rim to slide on the beveled surface on one side of the wheel and having gotten out of alignment, it is difficult to restore it to alignment.

Also the probability of uneven or irregular tightening of the clamps has been the cause of much misalignment, both in respect to dual and single rims.

An underlying cause of the trouble in securing accurate and exact alignment of rims and wheels has been the fact that the rims are made by one set of manufacturers who make the rims by rolling which does not give accurate measurements or maintain such tolerances as are sought to be established. Rims are uneven and irregular in spite of the most careful supervision.

The wheel manufacturers have attempted to make wheels in such a way as to secure alignment of rims and wheels, but they have not been successful heretofore.

The present invention has for its object the redesigning and reconstruction of both rims and wheels in such a way that both single rims and the inboard and outboard rims of a dual rim mounting will be maintained in exact alignment at all times and the results are secured without excessive alteration of standard practices in the manufacture of rims or wheels.

The result has been accomplished by the provision on a wheel of the standard form, of true horizontal bearing surface or surfaces which have an extremely close fit with the under or inside diameters of the inboard and outboard rims. Instead of being wholly supported by the beveled under surfaces of the gutters, which rest upon bevel surfaces on the rim or clamping devices, the rims are also supported by the inside circumferences of the rim gutters which rest upon flat horizontal surfaces which are accurately machined to an exceedingly close fit with the inside diameters of the gutters. In actual practice the inside diameter of the gutter of each rim is practically the same as the outer side diameter of the horizontal seat on the wheel. The difference between the two diameters is sufficient to provide only a slip fit between rim and wheel and should not be in excess of .015" on diameters in a rim having a tire seat diameter of 20 inches. This will be just enough to allow the rims to be fitted about the wheel but will insure that the loads will be borne by the horizontal surfaces of the wheels as well as on the beveled shoulders of the wheel or clamping lugs.

In the past, drawings of wheels and rims have apparently shown close fitting contacts between rim gutters and wheels but in actual construction this has not been the true state of facts. So far as known to this applicant, designers and manufacturers of wheels and rims have not realized that if the rims are supported by the inside diameters of rim gutters on tight fitting horizontal surfaces parallel to the axis of the wheel, the problem of misalignment of the rims and difficulties of mounting and maintaining them in true alignment will be overcome.

If the rim gutter does not rest on the flat horizontal surfaces, then the bumps received in use will cause the rim bevel to slide on the bevel seats, putting a greater strain on the clamps and nuts and will loosen them, which is not the case with a single or dual rim mounting of this invention.

In order to achieve the beneficial results of the invention in dual rim mountings both the inboard and outboard rims must be in alignment for if one is out of alignment the effect thereof will be transmitted to the other. Between the two rims a spacer ring is located, the sides or flanges of which bear against the outside of the gutter of both rims. To achieve the results these outer flange walls should lie in a plane which is truly radial to the axis of the wheel and the contacting surfaces of the gutters should be likewise true because irregularity in either will produce misalignment. For this purpose the outer surfaces of the flanges are machined or otherwise straightened to a true plane at right angles to the axis of the wheel and the same operation may be performed on the outer lateral faces of the gutters of both rims.

Another element, in dual rim mounting especially, which contributes substantially to the results is the construction of the clamps which exert the pressure against the beveled surface of the gutter on the outboard rim. If some of the clamps are tightened more than others the rims are apt to be out of alignment. In order to prevent misalignment, the clamps are made so that each has a limited inward movement determined by stops or abutments and all clamps will be driven inwardly to the same extent, such that the inner ends of the clamps all lie in a plane parallel to the plane of rotation of the wheel.

It will be understood that in order to describe the invention properly so that it will be apparent to one skilled in this art, it has been necessary to go into considerable detail. However, having explained the invention, variations and departures which do not sacrifice the essential features hereof may be employed within a fair construction of the appended claims.

Figure 2:
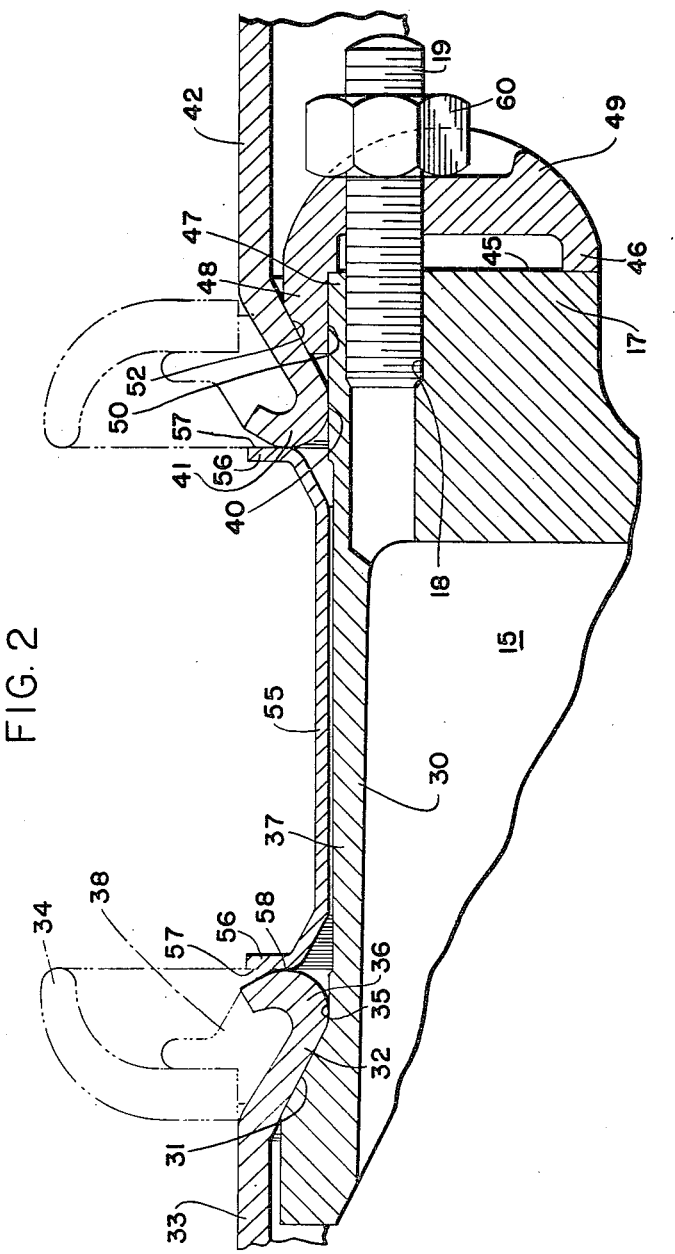
Figure 3:
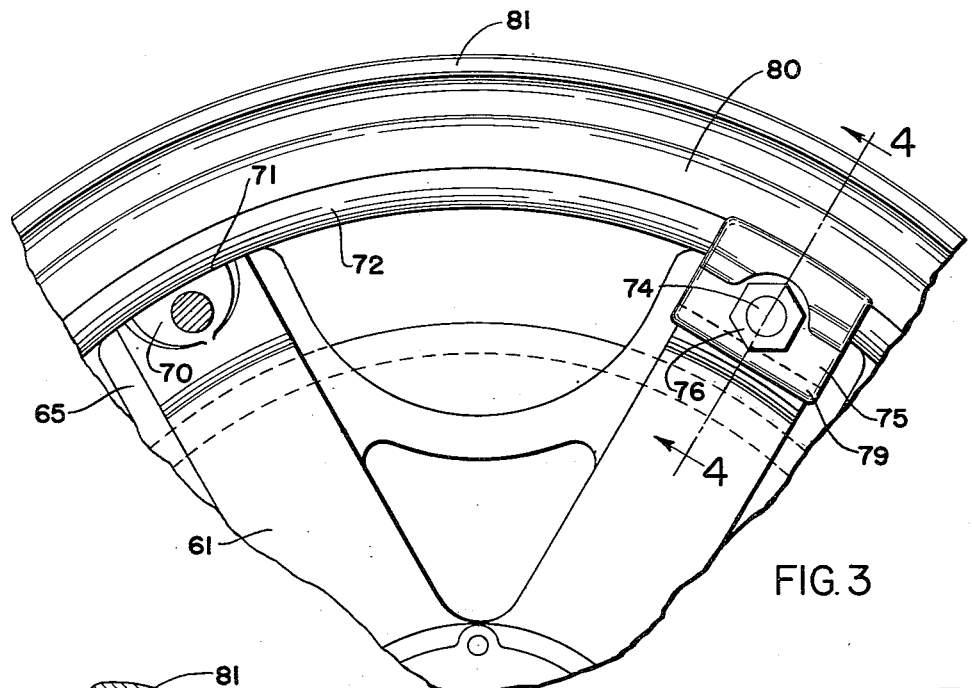
Figure 4:
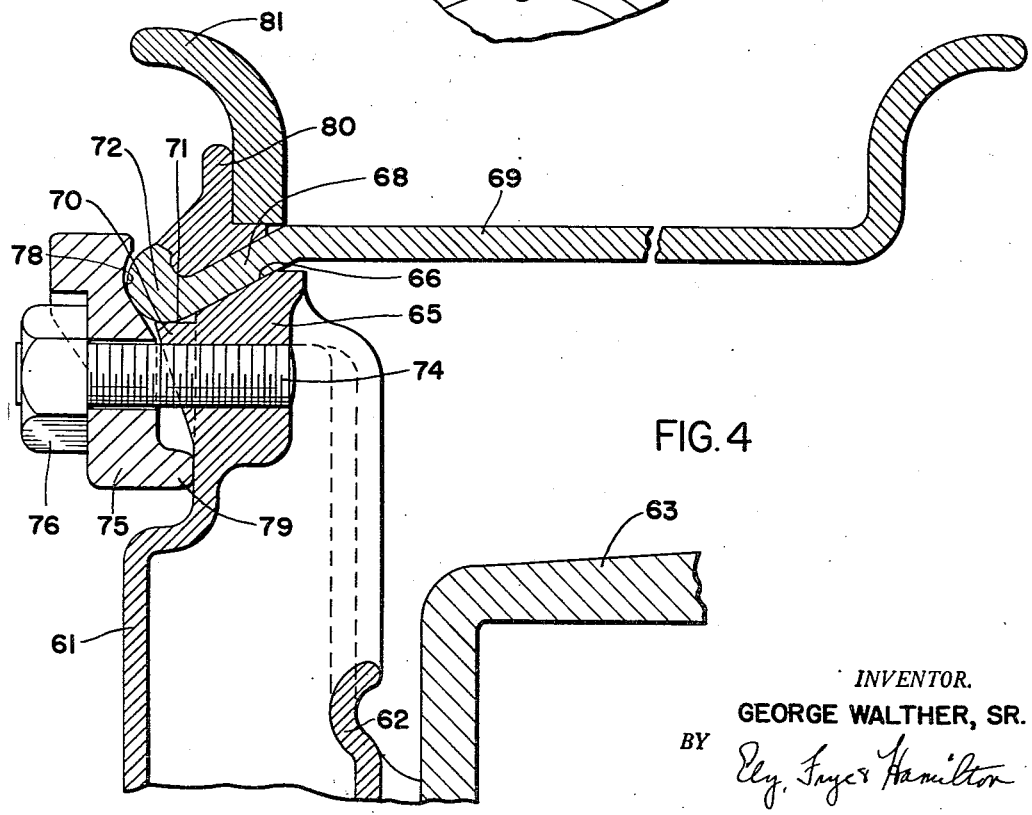

In the drawings:

Fig. 1 is a fragmentary vertical cross-section showing a dual rim mounting and wheel embodying the present invention, Fig. 2 is an enlarged cross-section taken substantially on line 2—2 of Fig. 1, Fig. 3 is a fragmentary plan view showing a single rim mounting wheel embodying the invention, and Fig. 4 is a cross-section taken substantially on line 4—4 of Fig. 3.

As shown in Figs. 1 and 2, when embodied in a dual rim mounting, the invention comprises a conventional vehicle wheel having a hub, a plurality of spokes extending radially of the hub and an outer bearing surface. The bearing surface is beveled at the inside end. That is, it has an inclined radially outward end. Adjacent to the beveled flange and joining it at the base is a true horizontal surface. This surface is symmetrical with, and parallel to, the axes of rotation of the wheel and rims, and is concentric at all points, both across its width and around its circumference. In order to facilitate mounting of the inner tire rim, a portion of the bearing surface preceding the inner true horizontal surface may be of a lessened diameter although this is not essential. The bearing surface for the outboard rim is another true horizontal surface, and in addition there is a right angle lug positioning edge at the extreme end of the outer bearing surface. The outer bearing surface of the wheel thus may have five distinct circumferential areas: a beveled area, a true horizontal area for the inboard rim, a central portion of lessened diameter, a second true horizontal area for the outboard rim, and a lug positioning edge.

To mount dual tires, a tire rim is placed on the wheel with the rim gutter facing outward and the rim is slid backwards until the rim gutter contacts the beveled area and the inside diameter of the gutter rests upon the true horizontal area. The diameter of the horizontal area is machined so as to conform within a very close tolerance to the inner diameter of the tire rim gutter. Heretofore, in the design of such a wheel it was never intended that the rims be supported on a true horizontal surface. However, it has been found that the provision of such a surface permits concentric and lateral alignment of the rims. Further, once the rim is in place, the true surface acts as a centering abutment, and the rim will not slide on the beveled surface while a spacer, outer rim and rim lugs are mounted and tightened.

The spacer which is located around the wheel to assist in maintaining the position of the rims, is an annular U-shaped section, the outer surfaces of which are formed by flanges which are exactly parallel. After the inner rim and the spacer are in place, the outer tire is placed on the wheel with the rim gutter facing inward. The diameter of the outer horizontal surface is also chosen so as to conform within a very close tolerance to the inner diameter of the outer tire rim gutter. When the outer rim is thus positioned on its mounting surface, the rim lugs are bolted to the wheel.

Referring to the drawings:

The vehicle wheel shown in Figs. 1 and 2 is of standard design and may be a forging or a casting and is provided with a hub indicated generally by the numeral 10. The hub is provided with finished seats 11 and 12 to receive suitable anti-friction bearings. When the axle and bearings are in place, the outer end 13 of the hub is closed with a cover plate (not shown) bolted into tapped holes 14.

Extending radially of the hub in circumferentially spaced apart relationship are a plurality of spoke members 15.

Each spoke section 16 is dished inwardly toward the innerside 20 of the wheel and between each spoke is an annular section of a rib 21 which has bolts 22 extending therethrough serving to fasten a brake drum 23 by means of nuts 24 and 25 to the vehicle wheel.

Each of the spoke members 15 terminates in an axially extending circumferential outer bearing surface 30 which provides the felly or rim segment of the wheel. Referring to the detailed view in Fig. 2, the felly 30 has at the inner portion thereof a beveled or inclined radially outward bearing surface 31. The amount of inclination of this surface is chosen to correspond with the angle of the turned edge or rim gutter 32 of a conventional inner tire rim 33 to be mounted on the wheel. Joining the beveled surface 31 at the base thereof is a true horizontal surface 35 which seats the rim gutter of the tire rim as described above.

Adjoining the surface 35, the central portion 37 of the felly may have its diameter relieved as shown, to form an area of lessened diameter so that the inner rim 33 may readily be slid back and seated on surfaces 31 and 35.

Adjoining the central portion 37, and extending to the front of the member 15, is a second horizontal surface 40 which seats the rim gutter 41 of the outer tire rim 42. The diameters of surfaces 35 and 40 are machined so that each is in close sliding fit with the inner diameter of rim gutters 36 and 41. Where the rims are badly out of round it may be necessary to machine the inside surfaces of the gutters. The gutters are to receive the usual removable flange 34 and lock ring 38.

The outer front surfaces 45 of the spoke members 15 are at exact right angles to the surfaces 40 and this provides an external plane surface to receive the lower end prongs 46 and the notched shoulder 47 on the inner side of the upper prong 48 of rim fastening lugs 49. The end of prong 46 and the transverse surface of shoulder 47 are coplanar which prevents the lug from being fastened too tightly and also indicates whether each lug has been drawn up to the same extent. Above the shoulder 47, the inner surface 50 of the upper prong is parallel with surface 40. The outer surface 52 of the upper prong 48 is beveled or inclined radially inward at an angle which corresponds with the angle of the rim gutter 41.

After the inner rim 33 has been placed on the wheel and seated on surfaces 31 and 35, an annular spacer ring 55 is placed on the wheel. The width of the spacer ring is so chosen as to fit against rim gutters 36 and 41 when the inner rim is in the position as described above and the outer rim is seated on surfaces 40 and 52. In order to ensure this proper fit, the vertical flanges 56 of the channel-shaped spacer are machined so that the outer surfaces 57 are exactly parallel with each other, and the outer lateral surfaces of the gutters may be machined as at 58 to remove any unevenness along this surface.

When the spacer ring 55 is in place, the outer rim 42 is mounted on the wheel. The entire assembly of inner rim, spacer ring and outer rim is fastened on the wheel and held in place by the tightening of nuts 60 threaded on bolts 19 which tightens the lug 49 against the rim gutter 41.

The function of the rim positioning edge, which is defined by surfaces 40 and 45, is to permit the rim fastening lugs 49 to be tightened only so far, and no further. It has been found that even though the horizontal surfaces tend to maintain the tire rims in concentric and lateral alignment, that tightening one lug bolt more than another may result in distortion of the rim and a loss of alignment. Therefore, the lug positioning edge is provided to engage with the cooperating shoulder 47, on the inner surface of a rim lug and prevent the lug from being tightened to an extent which would distort the tire rims. When properly tightened, the inner rim is seated on both the beveled area and the inner true horizontal surface, the spacer is separating the two rims, and the outer rim is seated on both the outer true horizontal surface and the beveled area on the outer surface of the rim lug. The function of the clamps is merely to hold the assembly together.

The single rim vehicle wheel, shown in Figs. 3 and 4, is of standard design having an outer web element 61 and an inner web element 62. The brake drum 63 is fastened to the inner web by suitable means (not shown). The outer web has an axially extending circumferential bearing surface 65 which provides the felly of the wheel. Referring to Fig. 4, the felly 65 has at the inner portion thereof a beveled or inclined radially outward bearing surface 66. The amount of inclination of this surface is chosen to correspond with the angle of the rim gutter 68 of a conventional tire rim 69 to be mounted on the wheel. Extending outwardly from the front of felly 65, is a ledge 70 which contacts the turned edge of the rim gutter 68. The ledge has a true horizontal surface 71 as defined above, which is in close tolerance with the inner diameter of the outer bead 72 of the rim gutter 68, and which, together with the beveled surface 66, acts as the load bearing surfaces of the wheel.

The surface 65 is provided with a plurality of bolts 74 which function to permit the fastening of a plurality of rim fastening lugs 75 against the rim gutter 68 by means of bolts 76. Each rim lugs 75 has a concave area 78 which conforms generally to the rounded outer bead 72. In order to prevent the lug from being tightened to an extent which would distort the tire rim, the lugs 75 are provided with an inwardly extending prong 79 which contacts the support structure 65 below the ledge 70. Elements 80 and 81 are conventional tire bead clamp means.

Improved vehicle wheels embodying the elements of the invention have been described herein in two preferred embodiments. However, changes and modifications of both the single and dual mounting could be made therein and these are intended to be included within the scope of the subjoined claims.

What is claimed is:

1. Means for mounting dual tire rims on wheels, including an inboard rim and an outboard rim, each of said rims having an inwardly extending gutter, a wheel having two bearing surfaces inwardly of the two rim gutters, the inside diameters of the gutters being the same and the outside diameters of the bearing surfaces being the same, an abutment for one side of the gutter on the inboard rim, a spacer lying between and in contact with the gutters of the rims, and clamping means beneath the gutter for the outboard rim, the said bearing surfaces being parallel to and concentric with the axis of the wheel throughout, the said gutters and said bearing surfaces being spaced to an extent of the order of .015 of an inch on the diameters whereby the rims may be moved axially along the bearing surfaces but the loads of both rims are borne by the said bearing surfaces around the entire periphery of the wheel.

2. Means for mounting dual tire rims on wheels, including an inboard rim and an outboard rim, each of said rims having an inwardly extending gutter, a wheel having two bearing surfaces inwardly of the two rim gutters, the inside diameters of the gutters being the same and the outside diameters of the bearing surfaces being the same, an abutment for one side of the gutter on the inboard rim, a spacer lying between and in contact with the gutters of the rims, and clamping means beneath the gutter of the outboard rim, the said bearing surfaces being parallel to and concentric with the axis of the wheel throughout, the said gutters and said bearing surfaces being spaced to an extent of the order of .015 of an inch on the diameters whereby the rims may be moved axially along the bearing surfaces but the loads of both rims are borne by the said bearing surfaces around the entire periphery of the wheel, and means to limit the inward movement of said clamping means to hold said clamping means in a plane parallel to the plane of rotation of the wheel.

3. Means for mounting dual tire rims on wheels, including an inboard rim and an outboard rim, each of said rims having an inwardly extending gutter, a wheel having two bearing surfaces inwardly of the two rim gutters, the inside diameters of the gutters being the same and the outside diameters of the bearing surfaces being the same, an abutment for one side of the gutter on the inboard rim, a spacer lying between and in contact with the gutters of the rims, and clamping means beneath the gutter of the outboard rim, the said bearing surfaces being parallel to and concentric with the axis of the wheel throughout, the said gutters and said bearing surfaces being spaced to an extent of the order of .015 of an inch on the diameters whereby the rims may be moved axially along the bearing surfaces but the loads of both rims are borne by the said bearing surfaces around the entire periphery of the wheel and the sides of said spacer and the lateral outer edges of the gutters are lying throughout in planes parallel to the plane of rotation of the wheel.

4. Means for mounting dual tire rims on wheels, including an inboard rim and an outboard rim, each of said rims having an inwardly extending gutter, a wheel having two bearing surfaces inwardly of the two rim gutters, the inside diameters of the gutters being the same and the outside diameters of the bearing surfaces being the same, an abutment for one side of the gutter on the inboard rim, a spacer lying between and in contact with the gutters of the rims, clamping means beneath the gutter of the outboard rim, the said bearing surfaces being parallel to and concentric with the axis of the wheel throughout, the said gutters and said bearing surfaces being spaced to an extent of the order of .015 of an inch on the diameters whereby the rims may be moved axially along the bearing surfaces but the loads of both rims are borne by the said bearing surfaces around the entire periphery of the wheel and the sides of said spacer and the lateral outer edges of the gutters are lying throughout in planes parallel to the plane of rotation of the wheel, and means to limit the inward movement of said clamping means to hold said clamping means in a plane parallel to the plane of rotation of the wheel.

5. A vehicle dual tire mounting comprising, in combination: a vehicle wheel having a hub element, a plurality of spokes extending radially of said hub, and an axially extending circumferential outer bearing surface at the end of each spoke, said outer bearing surface having a beveled portion at one end thereof, a true horizontal surface adjacent to said beveled portion, and a lug positioning edge at the other end thereof; an inner tire rim having an inner diameter in close tolerance with the outer diameter of said true horizontal surface, said tolerance being not more than .015 of an inch; an outer tire rim having an inner diameter in close tolerance with the outer diameter of said true horizontal surface, said tolerance being not more than .015 of an inch; an annular U-shaped spacer ring having exactly parallel outer surfaces in contact with opposed edges of said rims; and a plurality of rim fastening lugs, said lugs having a shoulder on the inner surface thereof for engaging with said lug positioning edge.

6. A vehicle dual tire mounting comprising, in combination: a vehicle wheel having a hub element, a plurality of spokes extending radially of said hub, and an axially extending circumferential outer bearing surface at the end of each spoke, said outer bearing surface having a beveled portion at one end thereof, a true horizontal surface adjacent to said beveled portion, a central portion of lessened diameter adjacent to said true horizontal surface, a second true horizontal surface adjacent to said central portion, and a lug positioning edge at the other end thereof; an inner tire rim having an internal diameter in close tolerance with the outer diameter of said first true horizontal surface, said tolerance being not more than .015 of an inch; an annular U-shaped spacer ring having exactly parallel outer surfaces; an outer tire rim having an inner diameter in close tolerance with the second horizontal surface, said tolerance being not more than .015 of an inch; a lug bearing against the outer rim; and means to draw the lug against the said positioning edge to hold the rims and the spacer ring on the wheel.

7. A vehicle dual tire mounting comprising, in combination: a vehicle wheel having a hub element, a bearing surface support structure extending radially of said hub, and an axially extending circumferential outer bearing surface surrounding the support structure, said outer bearing surface having a beveled portion at one end thereof, a true horizontal surface adjacent to said beveled portion, a central portion of lessened diameter adjacent to said true horizontal surface, a second true horizontal surface adjacent to said central portion, and a lug positioning edge at the other end thereof; an inner tire rim having an internal diameter in close tolerance with the outer diameter of said first true horizontal surface, said tolerance being not more than .015 of an inch; an annular U-shaped spacer ring having an inner diameter in close tolerance with the outer diameter of said second true horizontal surface, said tolerance being not more than .015 of an inch, and with its sides in contact with the opposed edges of the rims; and a plurality of rim fastening lugs, said lugs having a shoulder on the inner surface thereof for engaging with said lug positioning edge.

8. A vehicle wheel having a hub element, spokes extending radially of the hub and an axially extending circumferential outer bearing surface at the end of each spoke, said outer bearing surface having a beveled portion at one end thereof, a true horizontal surface adjacent to the beveled portion and a lug positioning edge at the other end thereof, a tire rim having an inner diameter in close tolerance with the outer diameter of the said horizontal surface, said tolerance being not more than .015 of an inch, and a plurality of rim fastening lugs, said lugs having a shoulder on the inner surface thereof for engaging the lug positioning edge.

9. Means for mounting a tire rim on a wheel, said rim having an inwardly extending gutter with a beveled inner surface, a wheel having a beveled surface to correspond to the beveled surface on the gutter, and true horizontal surfaces at the base of the beveled surface on the wheel parallel to and concentric with the axis of the wheel, the inner surface of said gutter and the said bearing surfaces being spaced to an extent of the order of .015 of an inch on diameters whereby the rim may be moved axially along the bearing surface but the load of the rim is borne by the bearing surfaces around the entire periphery of the wheel, and clamping means to hold the rim in position on the wheel.

10. A vehicle tire mounting comprising, in combination: a vehicle wheel having a hub element, a bearing surface support structure extending radially of said hub, said support structure having a ledge on the front thereof, said ledge having a true horizontal surface, and an axially extending circumferential outer bearing surface surrounding said support structure above said ledge and having a beveled portion on the outer side thereof; a tire rim having a rim gutter in close tolerance with the diameter of the true horizontal surface of said ledge, said tolerance being not more than .015 of an inch; and a plurality of rim fastening lugs engaging with said rim gutter to hold said rim gutter against said ledge and beveled surface.

11. Means for mounting a tire rim on a wheel, said rim having an inwardly extending gutter with a beveled inner surface, a wheel having a beveled outer surface to correspond to the beveled surface on the gutter, and a true horizontal surface on the front of said wheel adjacent to said beveled outer surface and parallel to and concentric with the axis of the wheel, the inner diameter of the bead of said gutter being spaced to an extent of the order of .015 of an inch whereby the load of the rim is borne by said true horizontal surface and said beveled outer surface, and clamping means to hold the rim in position on the wheel.

References Cited in the file of this patent

UNITED STATES PATENTS

| 1,679,454 | Wagenhorst | Aug. 7, 1928 |
| 2,135,481 | Brink | Nov. 8, 1938 |
| 2,491,150 | Ash | Dec. 13, 1949 |
| 2,653,057 | Sherman | Sept. 22, 1953 |